(12) United States Patent
Bulot et al.

(10) Patent No.: US 11,492,968 B2
(45) Date of Patent: Nov. 8, 2022

(54) DISCHARGE DUCT OF AN INTERMEDIATE HOUSING HUB FOR AN AIRCRAFT TURBOJET ENGINE COMPRISING COOLING CHANNELS

(71) Applicant: SAFRAN AIRCRAFT ENGINES, Paris (FR)

(72) Inventors: Benjamin Bulot, Moissy-Cramayel (FR); Pradeep Cojande, Moissy-Cramayel (FR); Eva Julie Lebeault, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 5 days.

(21) Appl. No.: 16/652,826

(22) PCT Filed: Oct. 2, 2018

(86) PCT No.: PCT/FR2018/052425
§ 371 (c)(1),
(2) Date: Apr. 1, 2020

(87) PCT Pub. No.: WO2019/069011
PCT Pub. Date: Apr. 11, 2019

(65) Prior Publication Data
US 2020/0232393 A1 Jul. 23, 2020

(30) Foreign Application Priority Data

Oct. 5, 2017 (FR) ..................................... 17 59348

(51) Int. Cl.
*F02C 7/14* (2006.01)
*F02C 7/18* (2006.01)
(Continued)

(52) U.S. Cl.
CPC .................. *F02C 7/14* (2013.01); *F02C 7/18* (2013.01); *F02C 6/08* (2013.01); *F02C 9/18* (2013.01); *F05D 2260/213* (2013.01)

(58) Field of Classification Search
CPC ........ F05D 2260/213; F02C 6/08; F02C 7/14; F02C 7/18; F02C 9/18
See application file for complete search history.

(56) References Cited

U.S. PATENT DOCUMENTS 4,771,825 A * 9/1988 Chen .......................... F28F 1/20
165/172
4,966,230 A * 10/1990 Hughes ................... F28D 7/087
165/DIG. 497
(Continued)

FOREIGN PATENT DOCUMENTS

EP          0511770 A1   11/1992
FR          2961251 A1   12/2011
(Continued)

OTHER PUBLICATIONS

Search Report issued in French Patent Application No. 17 59348 dated May 17, 2018.

(Continued)

*Primary Examiner* — Katheryn A Malatek
*Assistant Examiner* — Alyson Joan Harrington
(74) *Attorney, Agent, or Firm* — Pearne & Gordon LLP

(57) ABSTRACT

A discharge duct (30) of an intermediate housing hub for an aircraft turbojet engine, comprises an inlet end (41) and an outlet end (42), intended to ensure the passage of air from at least one discharge inlet opening to at least one secondary outlet opening, and comprising an ejection grill (32) arranged at the outlet end (42), the ejection grill (32) comprising a plurality of fins (43), characterised in that the
(Continued)

fins (43) comprise flow channels (44) for a fluid to be cooled, so as to form a heat exchange system.

8 Claims, 4 Drawing Sheets

(51) Int. Cl.
*F02C 9/18* (2006.01)
*F02C 6/08* (2006.01)

(56) References Cited

U.S. PATENT DOCUMENTS

| | | | | |
|---|---|---|---|---|
| 2006/0042223 | A1* | 3/2006 | Walker | F01D 25/162 60/39.08 |
| 2009/0294112 | A1* | 12/2009 | Reifel | B21C 23/10 165/179 |
| 2016/0369706 | A1* | 12/2016 | Suciu | F02K 3/115 |
| 2017/0159489 | A1 | 6/2017 | Sennoun | |
| 2018/0038243 | A1* | 2/2018 | Rambo | F02K 3/115 |

FOREIGN PATENT DOCUMENTS

| | | | | |
|---|---|---|---|---|
| FR | 2989108 | A1 * | 10/2013 | F02C 7/14 |
| FR | 3036136 | A1 | 11/2016 | |
| WO | 2010136710 | A2 | 12/2010 | |
| WO | 2016156739 | A1 | 10/2016 | |
| WO | WO-2016185119 | A1 * | 11/2016 | F02C 9/18 |

OTHER PUBLICATIONS

International Search Report issued in Application No. PCT/FR2018/052425 dated Jan. 18, 2019.
Written Opinion issued in Application No. PCT/FR2018/052425 dated Jan. 18, 2019.

* cited by examiner

DISCHARGE DUCT OF AN INTERMEDIATE HOUSING HUB FOR AN AIRCRAFT TURBOJET ENGINE COMPRISING COOLING CHANNELS

This is the National Stage of PCT international application PCT/FR2018/052425, filed on Oct. 2, 2018 entitled "DISCHARGE DUCT OF AN INTERMEDIATE HOUSING HUB FOR AN AIRCRAFT TURBOJET ENGINE COMPRISING COOLING CHANNELS", which claims the priority of French Patent Application No. 17 59348 filed Oct. 5, 2017, both of which are incorporated herein by reference in their entirety.

TECHNICAL FIELD

The present invention relates to the field of aircraft turbojet engines, and more particularly to the general field of twin-spool and dual-flow turbojet engines.

The invention particularly relates to the field of fluid cooling required for the proper operation of the turbojet engines. It also relates to the field of intermediate housing hubs for aircraft turbojet engines, in particular of the type comprising at least two mechanically independent bodies.

In a twin-spool turbojet engine, "intermediate housing" usually denotes a housing wherein the hub is substantially arranged between a low-pressure compressor and a high-pressure compressor housing.

The present invention relates more particularly to an intermediate housing hub of the type comprising discharge valves (also known as variable bleed valves or VBVs).

The discharge valves are intended to regulate the flow rate at the inlet of the high-pressure compressor, in order in particular to limit the pumping risks of the low-pressure compressor, by enabling the evacuation of a portion of the air outside the annular flow space of the primary flow. Thus, the discharge ducts, or VBV ducts, fitted on the discharge valves, make it possible to drive the air pressure discharge from the primary flow to the secondary flow.

Furthermore, in the event of accidental entry into this flow space of water, particularly in the form of rain or hail, or indeed of various debris, which is liable to harm the operation of the turbojet engine, the discharge valves make it possible to recover this water or debris which is centrifuged in the flow space cited above and to eject it outside the latter.

In the case of dual-flow turbojet engines, these discharge valves are thus configured to allow the passage of air, water or debris from the flow space of the primary flow to an annular flow space of a secondary flow. To do this, the discharge valves particularly include ducts for discharging the primary flow to the secondary flow connecting orifices communicating respectively with the primary flow and the secondary flow.

Thus, more specifically, the invention relates to a discharge duct of an intermediate housing hub for an aircraft turbojet engine including an ejection grille provided with fins with channels for circulating a fluid to be cooled, an intermediate housing hub including such a discharge duct, an intermediate housing including such a hub, as well as an aircraft turbojet engine including such an intermediate housing.

PRIOR ART

Fluid cooling in a turbojet engine is a major concern for the proper operation thereof. This issue becomes even more critical when the turbojet engine is equipped with an accessory gear box (AGB), which requires a greater heat extraction capacity.

Thus, the cooling may be carried out by means of a surface air-cooled oil cooler (SACOC) situated downstream from the outlet guide vanes (OGV) on the outer portion of the aerodynamic jet. Such a SACOC type exchanger comprises fins suitable for increasing the heat exchange surface areas between the secondary flow from the fan and the fluid to be cooled.

However, adding cooling fins submerged in the flow gives rise to an increase in the aerodynamic losses directly impacting the aerodynamic thrust and the turbojet engine consumption. The dimensioning of these fins is carried out so as to enable fluid cooling at any point of the turbojet engine cycle. However, it is observed that the dimensioning is essentially created by the low-speed points where the fin area is significant to compensate for a low air flow rate in the aerodynamic jet.

Consequently, there is a need to propose an alternative solution for cooling fluids in a turbojet engine, and particularly in replacement of or in addition to a SACOC type surface air-cooled oil cooler.

DESCRIPTION OF THE INVENTION

The aim of the invention is that of remedying at least partially the needs mentioned above and the drawbacks in relation to the embodiments of the prior art.

The invention thus relates, according to one of the aspects thereof, a discharge duct of an intermediate housing hub for an aircraft turbojet engine, including an inlet end and an outlet end, intended to provide the passage of air from at least one discharge inlet orifice to at least one secondary outlet orifice, and including an ejection grille disposed at the level of the outlet end, said ejection grille including a plurality of fins, characterised in that the fins include channels for circulating a fluid to be cooled so as to form a heat exchange system.

Thanks to the invention, it may be possible to ensure effective cooling at any point of the engine cycle while limiting the impact of this solution on aerodynamic losses on performance points. Furthermore, the solution according to the invention makes it possible advantageously to combine two functions, namely redressing and cooling, on a single part. The invention also has the advantage of being adapted to the low-speed point where the VBV discharge duct grilles are active, namely open, therefore with air from the low-pressure compressor circulating in the discharge ducts and evacuated into the secondary flow.

The discharge duct according to the invention may further include one or more of the following features taken in isolation or according to any technically feasible combinations.

The circulation channels can particularly extend inside the fins, substantially parallel with one another.

The number and the cross-section of the circulation channels can be variable, being particularly directly linked to the heat exchange requirement and thus needing to be adapted.

For example, the circulation channels can have, as a cross-section, a circular shape. Alternatively, the circulation channels can have, as a cross-section, a star shape.

The circulation channels can be obtained by drilling in the fins. Alternatively, for greater ease, the fins, and therefore the circulation channels, can be obtained using an additive manufacturing method.

Moreover, the invention further relates, according to a further aspect thereof, to an intermediate housing hub for an aircraft turbojet engine, characterised in that it includes a discharge duct as defined above.

The intermediate housing hub can very particularly include:
- an inner annular ferrule intended to delimit, on one hand, externally a primary flow space of a primary gas flow in the turbojet engine, and, on the other, internally, the upstream section of at least one inter-jet zone, the inner annular ferrule being provided with at least one primary air passage orifice,
- an outer annular ferrule intended to delimit, on one hand, externally a secondary flow space of a secondary gas flow in the turbojet engine, and, on the other, internally, said at least one inter-jet zone, the outer annular ferrule being provided with said at least one secondary air passage outlet orifice,
- a downstream cross flange, connecting the inner and outer annular ferrules, delimiting upstream at least one intermediate space and downstream said at least one inter-jet zone, the downstream cross flange comprising said at least one discharge inlet orifice.

Moreover, the intermediate housing hub can include at least one discharge valve, comprising at least one movable gate suitable for extracting, from said at least one primary orifice, air circulating in the primary flow space and for directing said air to said at least one intermediate space, wherein said air in said at least one intermediate space is extracted towards the discharge duct, said discharge duct situated in said at least one inter-jet zone and formed to provide an air passage from said at least one discharge inlet orifice to said at least one secondary outlet orifice to direct the extracted air via said at least one discharge valve into the secondary flow space.

Furthermore, the invention also relates, according to a further aspect thereof, to an intermediate housing for an aircraft turbojet engine, characterised in that it includes a hub as defined above.

Moreover, the invention further relates, according to a further aspect thereof, to an aircraft turbojet engine, characterised in that it includes an intermediate housing as defined above.

The discharge duct, the intermediate housing hub, the intermediate housing and the aircraft turbojet engine according to the invention can include any one of the features cited in the description, taken in isolation or according to any technically feasible combinations with other features.

BRIEF DESCRIPTION OF THE DRAWINGS

The invention may be understood more clearly on reading the following detailed description, of non-limiting examples of embodiments thereof, as well as examining the schematic and partial figures of the appended drawing, wherein.

In all of these figures, identical references can designate identical or equivalent elements.

Furthermore, the different parts represented in the figures are not necessarily represented according to a uniform scale, in order to render the figures more readable.

Detailed Description of Particular Embodiments

Throughout the description, it is noted that the terms upstream and downstream are to be considered in relation to a main normal gas flow direction F (from upstream to downstream) for a turbojet engine 12. Moreover, axis T of the turbojet engine 12 refers to the axis of radial symmetry of the turbojet engine 12. The axial direction of the turbojet engine 12 corresponds to the axis of rotation of the turbojet engine 12, which is the direction of the axis T of the turbojet engine 12. A radial direction of the turbojet engine 12 is a direction perpendicular to the axis T of the turbojet engine 12. Moreover, unless specified otherwise, the adjectives and adverbs axial, radial, axially and radially are used with reference to the axial and radial directions cited above. Furthermore, unless specified otherwise, the terms internal (or inner) and external (or outer) are used with reference to a radial direction such that the internal portion of an element is closer to the axis T of the turbojet engine 12 than the external portion of the same element.

Figure 1:
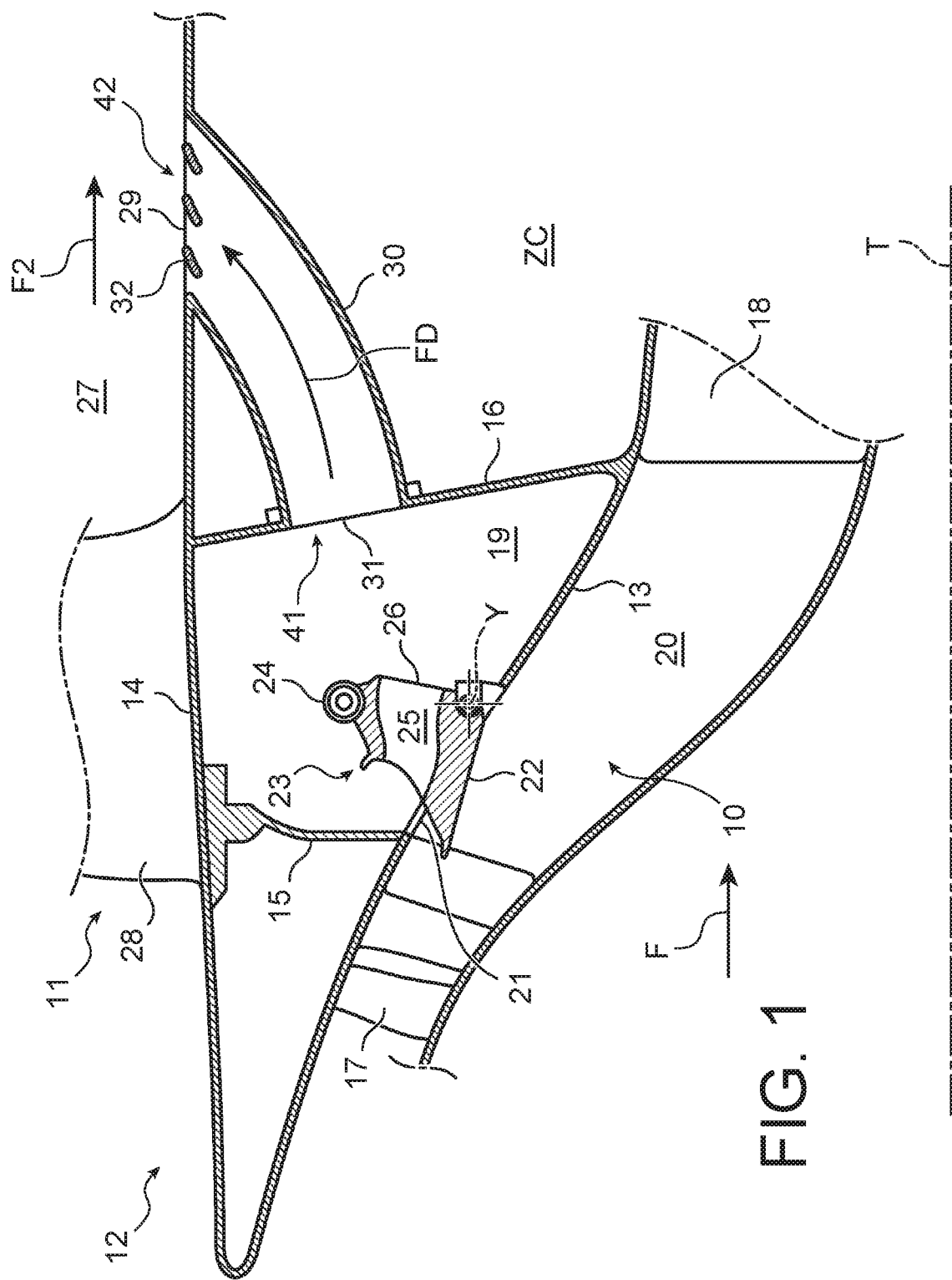
FIG. 1 represents, in an axial cross-section, an example of an intermediate housing hub for an aircraft turbojet engine.
Figure 2:
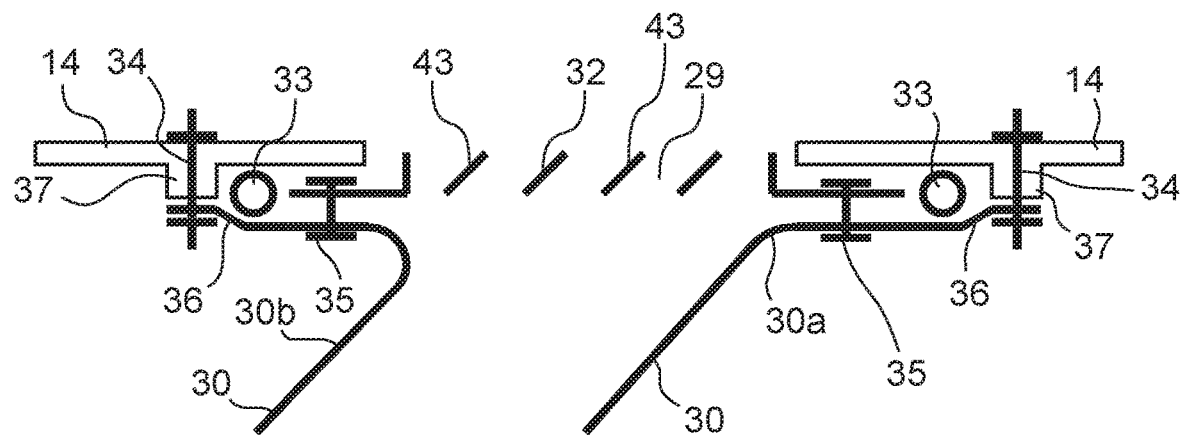
FIG. 2 illustrates, in a partial schematic axial cross-section, a principle of fastening a discharge duct to the outer ferrule of an intermediate housing hub for an aircraft turbojet engine, i.e. the creation of the interface between the discharge duct and the outer ferrule of the hub, comprising an ejection grille.

FIGS. 1 and 2 help illustrate the technical context of the invention as also described for example in French patent application FR 3 036 136 A1 filed by the Applicant.

Thus, FIG. 1 represents partially, in an axial cross-section, an example of a hub 10 of an intermediate housing 11 for a twin-spool and dual-flow aircraft turbojet engine 12 of a known type.

The hub 10 of the intermediate housing 11 usually includes two coaxial annular, respectively inner 13 and outer 14, ferrules mutually connected by two cross flanges, namely an upstream cross flange 15 and a downstream cross flange 16.

The upstream cross flange 15 is arranged downstream from a low-pressure compressor 17 of the turbojet engine 12, whereas the downstream cross flange 16 is arranged upstream from a high-pressure compressor 18 of this turbojet engine 12. This high-pressure compressor 18 generally comprises a succession of rotors and stators with variable timing, suitable for controlling the air flow rate traversing therethrough.

Moreover, between the inner 13 and outer ferrules 14, and between the upstream 15 and downstream cross flanges 16, intermediate spaces 19 are provided distributed about the axis of the hub 10, merged with the axis of rotation T of the turbojet engine 12. The intermediate spaces 19 are upstream from an inter-jet zone ZC.

Furthermore, the inner ferrule 13 delimits an annular primary flow space 20 of a primary flow of the turbojet engine 12. Moreover, the inner ferrule 13 includes air passage orifices 21, referred to hereinafter as primary orifices, each whereof is closed by the pivoting flap 22 of a corresponding discharge valve 23, intended for regulating the flow rate of the high-pressure compressor 18, and if applicable, for evacuating air, water or debris as explained above.

Such a discharge valve 23 usually takes the form of a gate 24, which includes the pivoting flap 22 at the radially inner end thereof and which is pivotably mounted about an axis Y such that, in the closing position of the primary orifices 21, the flap 22 extends the inner ferrule 13 of the intermediate housing 11 substantially continuously to optimally reduce the risks of aerodynamic disturbances of the primary flow by this flap 22, and that in the opening position of said primary orifices 21, the flap 22 projects radially inwards in relation to the inner ferrule 13 and thus forms a scoop for extracting a portion of the primary flow into the space 20. The gate 24 includes a pipe 25 whereby the scoop air transits, this pipe 25 ending downstream on an outlet orifice 26 opening into the corresponding intermediate space 19. French patent application FR 2 961 251 A1 filed by the Applicant also describes a further example of a discharge valve of an intermediate housing hub for an aircraft turbojet engine.

Moreover, the outer ferrule 14 delimits an annular secondary flow space 27 of a secondary flow F2 of the turbojet engine 12, and is connected to structural arms 28, relatively spaced apart from one another, traversing this space 27. Furthermore, the outer ferrule 14 includes air passage orifices 29, referred to hereinafter as secondary orifices, and arranged downstream from the downstream cross flange 16. In other words, in this example in FIG. 1, the air, water or debris is evacuated via the external ferrule 14.

However, in an alternative embodiment (not shown), when for example the outer ferrule 14 bears guide valves that are relatively close to one another, the latter impeding the above-mentioned evacuation through the outer ferrule 14. In this case, it may be desirable to enable this evacuation further downstream, via the annular wall of an extension of the hub of the intermediate housing, i.e. the annular wall of a structural part which is sometimes used to support at the downstream end thereof thrust reverser elements such as fairing panels.

When the variable-timing stators of the high-pressure compressor 18 are in a position reducing the air flow rate entering this compressor, excess air in the secondary flow space can then be evacuated via the secondary orifices 29, thus preventing pumping phenomena liable to result in damage, or even complete destruction, of the low-pressure compressor 17.

Moreover, as explained above, discharge ducts 30 each extend between a respective inlet orifice 31 opening into the intermediate space 19 and a corresponding secondary outlet orifice 29. The inlet orifice 31 is provided at an inlet end 41 of the duct 30 at the connection thereof with the downstream cross flange 16. Inside these discharge ducts 30 a discharge flow FD, from the primary flow, circulates towards the secondary flow F2. The inlet orifice 31 is generally arranged level with the surface of the downstream cross flange 16 overlooking the intermediate space 19. The secondary outlet orifice 29 includes for its part a control grille 32, fastened to the discharge duct 30 at the outlet thereof, to be able to control the discharge flow FD during the discharge thereof into the secondary flow F2. The secondary orifice 29 is provided at an outlet end 42 (FIG. 3) of the duct 30 at the connection thereof with the outer ferrule 14.

In each intermediate space 19, the outlet orifice 26 of the pipe 25 and the inlet orifice 31 of the discharge duct 30 are arranged facing one another.

Each gate 24, and the corresponding downstream intermediate space 19 and discharge duct 30 thus form together a system for evacuating air, water or debris, referred to generally using the expression "discharge valve", from the primary flow space 20 to the secondary flow space 27. The hub 11 therefore includes a plurality of such systems distributed about the axis T thereof.

When a gate 24 is in the open position, an air flow scooped thereby traverses the primary duct 25, opens into the intermediate space 19 via the outlet orifice 26 thereof, enters the corresponding discharge duct 30 until it reaches the secondary flow space 27.

Moreover, FIG. 2 represents, in a partial schematic axial cross-section, a principle of fastening of a discharge duct 30 to the outer ferrule 10 of an intermediate housing 11 of an aircraft turbojet engine 12, in other words the embodiment of the interface between the discharge duct 30 and the outer ferrule 14 of the hub 10.

Thus, the discharge duct 30 is fastened to the outer annular ferrule 14 at the level of the secondary outlet orifice 29 an airtight and fireproof seal 33, made for example of silicone, is arranged between the discharge duct 30 and the outer annular ferrule 14. More specifically, the outer ferrule 14 includes an annular boss 37 and the discharge duct 30 includes an annular dimpling 36. The fastening of the discharge duct 30 to the outer ferrule 14 is then carried out by means of screwing means 34 passing through the annular boss 37 and the annular dimpling 36. Furthermore, the assembly formed by the annular boss 37 and the annular dimpling 36 extends all around the seal 33, forming a separation between the seal 33 and the inter-jet zone ZC.

Moreover, an ejection grille 32, or control grille, is disposed at the level of the secondary outlet orifice 29. This ejection grille 32 includes a plurality of fins 43 for guiding the fluid from the low-pressure compressor to the secondary flow. The seal 33 is then disposed all around the ejection grille 32, which is fastened to the discharge duct 30 by screwing means 35. Thus, the seal 33 is situated between the ejection grille 32 and the assembly formed by the annular boss 37 and the annular dimpling 36.

Figure 3:
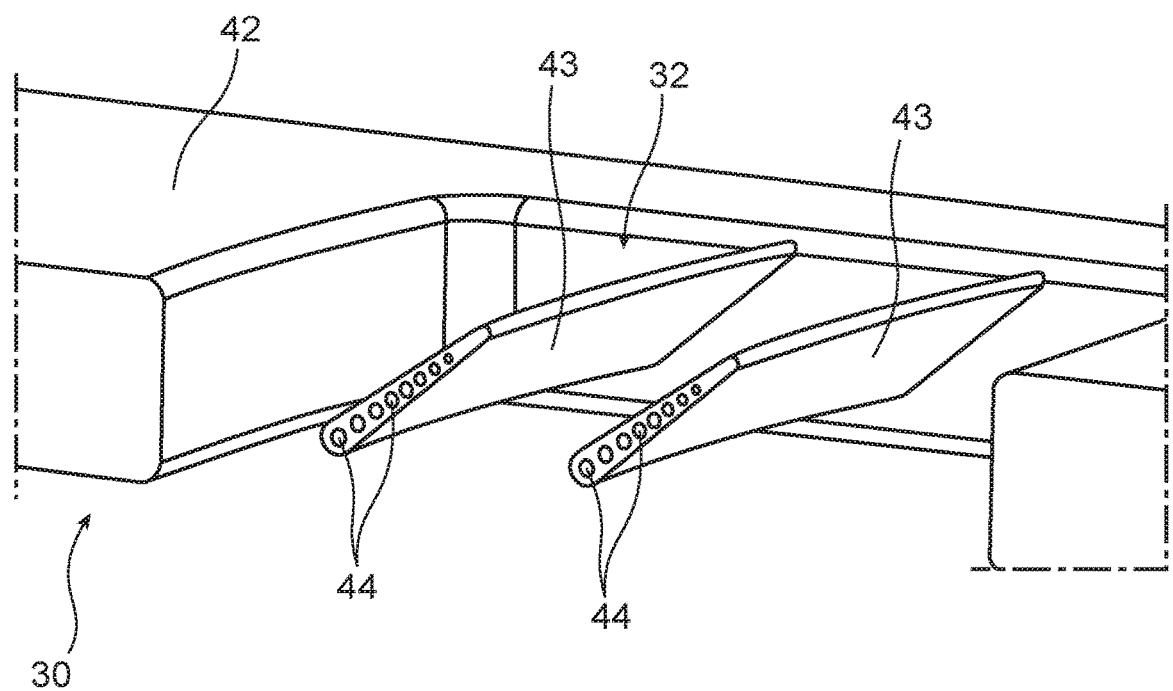
FIG. 3 illustrates, according to a partial perspective and cross-sectional view, an example of a discharge duct of an intermediate housing hub for an aircraft turbojet engine according to the invention, including an ejection grille with fins provided with channels for circulating a fluid to be cooled.
Figure 4:
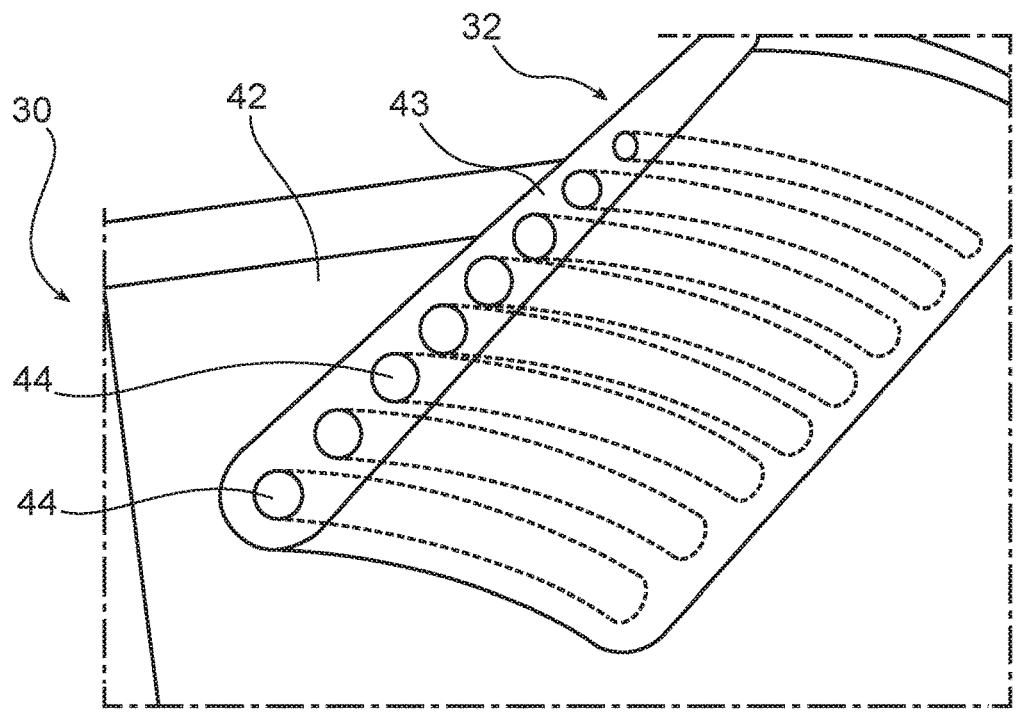
FIG. 4 illustrates, according to an enlarged partial perspective view, an embodiment detail of the circulation channels in FIG. 3.
Figure 5:
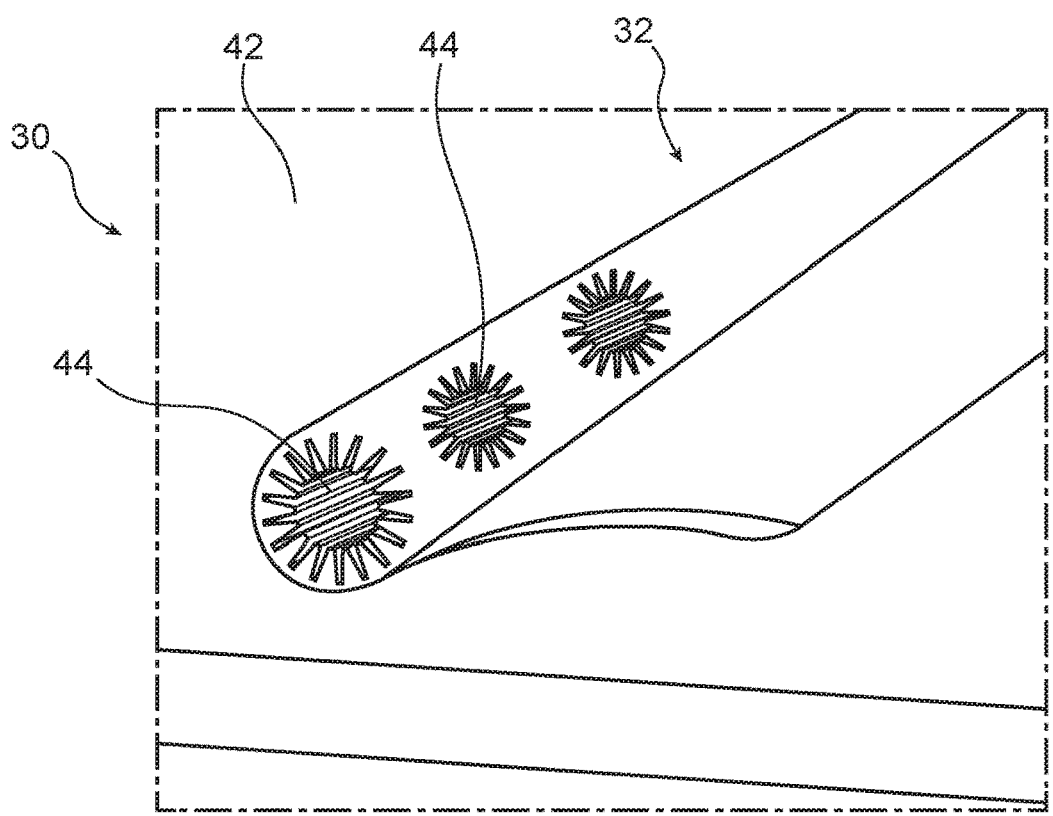
FIG. 5 illustrates, according to a partial perspective view, an alternative embodiment of the circulation channels in FIG. 3.

Advantageously, the solution according to the invention, seen in FIGS. 3 to 5, uses the fins 43 of the ejection grille 32 to form a heat exchanger suitable for cooling a given fluid.

Thus, FIG. 3 illustrates, according to a partial perspective view, an example of a discharge duct 30 according to the invention, including an ejection grille 32 with fins 43 provided with circulation channels 44 of a fluid to be cooled. FIG. 4 illustrates, according to an enlarged partial perspective view, an embodiment detail of the circulation channels 44 in FIG. 3, and FIG. 5 illustrates, according to a partial perspective view, an alternative embodiment of the circulation channels 44 in FIG. 3.

Advantageously, the fins 43 are modified, for example by drilling or by additive manufacture, so as to obtain multiple circulation channels 44 of a fluid to be cooled and to form a heat exchange system. The heat exchange is then carried out by means of the volume of the fins 43 capable of being modified to offer the largest possible heat exchange surface area.

With reference to FIGS. 3 and 4, the circulation channels 44 of the fins 43 can have, as a cross-section, a circular shape and can also extend inside the fins 43 substantially parallel with one another, as seen in FIG. 4.

In FIG. 5, the circulation channels 44 have, as a cross-section, a star shape. Indeed, this solution can be envisaged in order to maximise the heat exchange surface areas.

It should be noted that the hub 10 of an intermediate housing 11 according to the invention, associated with the discharge duct 30 in FIGS. 3 to 5 described above, can particularly be of the same type as that described with reference to FIGS. 1 and 2. Also, for the parts not shown in FIGS. 3 to 5, it is advised to refer to the previous description of FIGS. 1 and 2.

Figure 6:
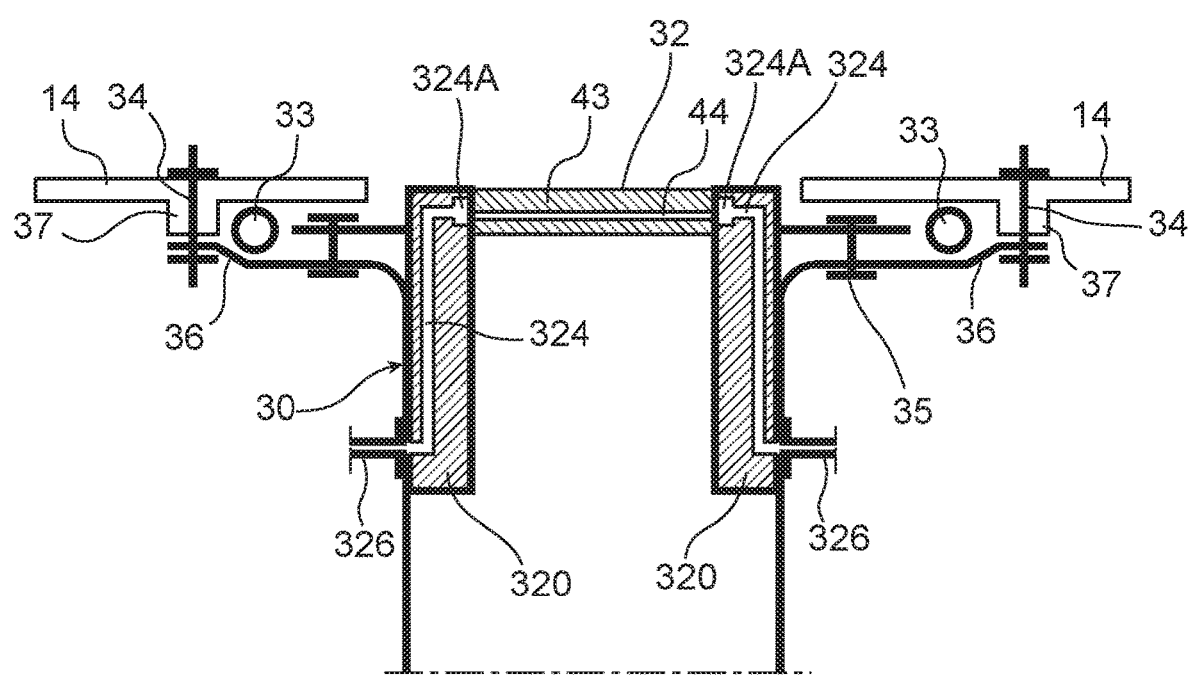
FIG. 6 illustrates, in a partial schematic radial cross-section, the grille in FIG. 2 for the connection thereof to an oil circuit.

Moreover, the circulation channels 44 are connected to an oil circuit of the type of that existing for usually supplying exchangers. FIG. 6 is a schematic, cross-sectional view taken radially to the axis of rotation of the engine through one of the fins 43 showing one of the channels 44 thereof. The lateral periphery of the grille is press-fitted to the longitudinal edges of the discharge duct 30, via lateral shanks 320. The ends of the fins 32 have the circulation channels 44 thereof tightly leading by means of known type to lines 324 provided in the shanks 320 of the grille 32. These lines 324 have at the ends thereof on the fin side, at each lateral edge of the grille, a manifold section 324A wherein the channels 44 open. At the other end, the lines 324 are connected via seals by means of known type to tubes 326 connected to the engine oil circuit, which does not need to be described.

Obviously, the invention is not limited to the examples of embodiments described above. Various modifications can be made by those skilled in the art.

What is claimed is:

1. A hub of an intermediate housing for an aircraft turbojet engine, including a discharge duct having an inlet end and an outlet end and defining an air passage from at least one inlet end orifice to at least one outlet end orifice with an air flow in the discharge duct flowing in an air flow direction toward said at least one outlet end orifice, and including an ejection grille disposed at a level of the outlet end, said ejection grille including a plurality of fins, wherein inside at least one of the plurality of fins is a plurality of circulation channels for circulating a fluid to be cooled so as to form a heat exchange system, the plurality of circulation channels being transverse to the air flow direction, said at least one of the plurality of fins extending across the discharge duct from a first shank at a first wall of the discharge duct to a second shank at a second wall of the discharge duct, the first shank configured to attach to one distal end of said at least one of the plurality of fins and the second shank configured to attach to an opposite distal end of said at least one of the plurality of fins, the first shank including a first manifold section inside the first shank and the second shank including a second manifold section inside the second shank, the plurality of circulation channels extending from the one distal end to the opposite distal end, wherein at the one distal end the plurality of circulation channels each open into the first manifold section and at the opposite distal end the plurality of the circulation channels each open into the second manifold section, the hub further including:
an inner annular ferrule delimiting externally a primary flow space of a primary gas flow in the turbojet engine and delimiting internally at least one inter-jet zone, the inner annular ferrule being provided with at least one primary air passage orifice,
an outer annular ferrule delimiting externally a secondary flow space of a secondary gas flow in the turbojet engine and delimiting internally said at least one inter-jet zone, the outer annular ferrule being provided with said at least one outlet end orifice, and
a downstream cross flange, connecting the inner and outer annular ferrules and delimiting upstream at least one intermediate space and delimiting downstream said at least one inter-jet zone, the downstream cross flange comprising said at least one inlet end orifice.

2. The hub of the intermediate housing according to claim 1, wherein the plurality of circulation channels extends inside said at least one of the plurality of fins parallel with one another.

3. The hub of the intermediate housing according to claim 1, wherein the plurality of circulation channels has a circular shaped cross-section.

4. The hub of the intermediate housing according to claim 1, wherein the plurality of circulation channels has a star shaped cross-section.

5. The hub of the intermediate housing according to claim 1, wherein the plurality of fins is formed by an additive manufacturing method.

6. The hub of the intermediate housing according to claim 1, further includes:
at least one discharge valve comprising at least one movable gate suitable for extracting through said at least one primary air passage orifice air circulating in the primary flow space and for directing said air to said at least one intermediate space, wherein said air is directed towards the discharge duct, the discharge duct situated in said at least one inter-jet zone and formed to provide the air passage from said at least one inlet end orifice to said at least one outlet end orifice to direct the air extracted via said at least one discharge valve in the air flow direction and into the secondary flow space.

7. An intermediate housing for an aircraft turbojet engine, including the hub according to claim 1.

8. An aircraft turbojet engine, including the intermediate housing according to claim 7.

* * * * *